United States Patent [19]
Lee

[11] Patent Number: 5,825,547
[45] Date of Patent: Oct. 20, 1998

[54] DIFFRACTIVE DEVICE FOR GENERATING ONE OR MORE DIFFRACTING IMAGES INCLUDING A SURFACE RELIEF STRUCTURE AT LEAST PARTLY ARRANGED IN A SERIES OF TRACKS

[75] Inventor: Robert Arthur Lee, Victoria, Australia

[73] Assignee: Commonwealth Scientific and Industrial Research Organisation, Australia

[21] Appl. No.: 591,922

[22] PCT Filed: Aug. 4, 1994

[86] PCT No.: PCT/AU94/00441

§ 371 Date: Feb. 5, 1996

§ 102(e) Date: Feb. 5, 1996

[87] PCT Pub. No.: WO95/04948

PCT Pub. Date: Feb. 16, 1995

[30] Foreign Application Priority Data

| Aug. 6, 1993 | [AU] | Australia | PM0387 |
| Sep. 10, 1993 | [AU] | Australia | PM1112 |
| Apr. 7, 1994 | [AU] | Australia | PM4867 |

[51] Int. Cl.[6] .............. G02B 5/18; G03H 1/08; G03H 1/26
[52] U.S. Cl. .............. 359/567; 359/569; 359/2
[58] Field of Search .............. 359/567, 569, 359/571, 2, 18; 283/91, 902

[56] References Cited

U.S. PATENT DOCUMENTS

| 3,567,561 | 3/1971 | Wood | 161/34 |
| 3,580,657 | 5/1971 | Sheridon | 350/3.5 |
| 4,155,627 | 5/1979 | Gale et al. | 350/162 R |
| 4,402,571 | 9/1983 | Cowan et al | 350/162.17 |
| 4,417,784 | 11/1983 | Knop et al. | 350/162.19 |
| 4,568,141 | 2/1986 | Antes | 359/2 |
| 4,589,686 | 5/1986 | McGrew | 283/85 |
| 5,032,003 | 7/1991 | Antes | 350/162.18 |
| 5,195,004 | 3/1993 | Hasegawa et al. | 359/18 |
| 5,428,472 | 6/1995 | Miyake et al. | 359/569 |
| 5,555,130 | 9/1996 | Marom et al. | 359/569 |

FOREIGN PATENT DOCUMENTS

| 4484064 | 11/1965 | Australia . |
| 8264382 | 10/1983 | Australia . |
| 1895783 | 3/1984 | Australia . |

(List continued on next page.)

OTHER PUBLICATIONS

M. T. Gale, "Sinusoidal relief Gratings for Zero–order Reconstruction of Black–and–white images ", *Optics Communications*, vol. 18, No. 3, Aug. 1976, pp. 292.

K. Knop and M. T. Gale, "ZOD Micro–Images:Colour and Black–and–white Image Reproduction from Surface Relief Gratings Structures", *Journal of Photographic Science*, vol. 26, 1978, p. 120.

R. Barton, "Bicentenary banknote is a forger's nightmare", *The Age*, Dec. 16, 1987.

*Primary Examiner*—Jon W. Henry
*Attorney, Agent, or Firm*—Ladas & Parry

[57] ABSTRACT

A diffractive device having a surface relief structure which, when illuminated by a light source, generates one or more diffraction images which are observable from particular ranges of viewing angles around the device, wherein at least part of the surface relief structure (1) is arranged in a series of tracks (2), each track (4, 5) having a diffracting surface (3) which generates a component of a diffraction image, such that at least one of the diffraction images generated by the diffractive device is formed from image components generated by a plurality of the tracks.

20 Claims, 5 Drawing Sheets

FOREIGN PATENT DOCUMENTS

| | | |
|---|---|---|
| 1957683 | 4/1984 | Australia . |
| 6645186 | 6/1987 | Australia . |
| 6282890 | 3/1991 | Australia . |
| 5372990 | 10/1991 | Australia . |
| 8760380 | 6/1992 | Australia . |
| 1909692 | 1/1993 | Australia . |
| 3739093 | 9/1993 | Australia . |
| 240261 | 10/1987 | European Pat. Off. . |
| 24262 | 10/1987 | European Pat. Off. . |
| 467601 | 1/1992 | European Pat. Off. . |
| 493268 | 7/1992 | European Pat. Off. . |
| 0497292 | 8/1992 | European Pat. Off. . |
| 3442794 | 8/1985 | Germany . |
| 1002611 | 8/1965 | United Kingdom .................. 359/569 |
| 1352001 | 5/1974 | United Kingdom . |
| 2219248 | 12/1989 | United Kingdom . |
| 8300395 | 2/1983 | WIPO . |
| 8707034 | 11/1987 | WIPO . |
| 9007133 | 6/1990 | WIPO . |
| 9103747 | 3/1991 | WIPO . |
| 9318419 | 9/1993 | WIPO . |
| 9324333 | 12/1993 | WIPO . |
| 9502200 | 1/1995 | WIPO . |

1

DIFFRACTIVE DEVICE FOR GENERATING ONE OR MORE DIFFRACTING IMAGES INCLUDING A SURFACE RELIEF STRUCTURE AT LEAST PARTLY ARRANGED IN A SERIES OF TRACKS

This invention relates to a diffractive device. It relates particularly to a diffractive device which, when illuminated by a light source, generates one or more diffraction images which are observable from particular ranges of viewing angles around the device. The device may be used in a number of different applications, and it has particular applicability as an anti-forgery security device on banknotes, credit cards, cheques, share certificates and other similar documents.

Several different types of diffractive devices which, when illuminated, generate diffractive images, are known. In January 1988, an Australian ten dollar banknote was released featuring a diffractive image of Captain Cook. The diffractive grating used in the image was for the most part comprised of substantially continuous lines, and the shapes and configurations of the lines were determined according to optical catastrophe theory in order to generate fine detail in the diffractive image observed.

International patent application PCT/AU90/00395, the contents of which are incorporated herein by reference, discloses an alternative method for generating an optical diffraction image. In this case, the diffractive device is divided into a large number of small diffraction grating structures, each of which diffracts a beam of light which acts as a pixel, with the pixels combining to form an overall image. According to preferred aspects of the arrangement disclosed, the respective diffraction grating of each pixel comprises a plurality of reflective or transmissive grooves or lines which are usually curved across the pixel. Groove or line curvature determines both local image intensity (eg. shading) and local optical structure stability. Groove or line spacing in each pixel grating determines local colour properties, with non-primary colours generated by a pixel mixing. Average groove or line orientation determines movement or colour effects. The overall surface structure of each pixel grating is selected from a palette of different grating types having a limited number of distinct values of average curvature and average spacing.

An advantage of the use of pixel gratings in a diffractive device is that it permits the device to generate more than one diffraction image. Some of the gratings can have diffractive surfaces with particular line spacing curvature and orientation characteristics which contribute to the generation of an image viewable from a particular range of viewing angles, and other gratings have different surface characteristics contributing to the generation of a different image viewable from a different range of viewing angles. This result is much more difficult to achieve in a continuous grating diffractive device.

Another advantage of a pixel grating diffractive device is that it allows storage of picture information in a digital format. However, a predetermined surface area on the diffractive device must be set aside for each pixel, and this is not the most efficient way of storing picture information in a limited space. Accordingly, there is scope for a more efficient manner of storing picture information in a diffraction grating.

Moreover, in a pixel grating diffractive device, there are inevitable discontinuities between adjacent gratings. Diffraction effects occur in these discontinuities. It is normally possible to ensure these extraneous diffraction effects are small relative to the intentional diffraction effects generated by the diffractive device, but the extraneous diffraction effects are still detectable. It is desirable to reduce the extraneous diffraction effects.

According to the present invention, there is provided a diffractive device having a surface relief structure which, when illuminated by a light source, generates one or more diffraction images which are observable from particular ranges of viewing angles around the device, wherein at least part of the surface relief structure is arranged in a series of tracks, each track having a diffracting surface which generates a component of a diffraction image, such that at least one of the diffraction images generated by the diffractive device is formed from image components generated by a plurality of the tracks and wherein at least some tracks have diffracting grooves or other shapes on their surfaces, varying continuously in terms of orientation, curvature and/or spacing along the track, the variations in orientation, curvature and/or spacing being a means by which image information is encoded into the tracks.

Tracks may be of any suitable shape, size and configuration. It is preferred that individual tracks have a length greater than 0.5 mm. It is further preferred that each track has a width of less than 0.25 mm. A width of 0.25 mm represents approximately the limit of resolution of the human eye when viewing a diffractive device from close quarters, so that a track having a width of less than 0.25 mm is unlikely to be separately discernible to the human eye.

The tracks may be in any suitable configuration. In one preferred arrangement, the tracks are straight and parallel, in side-by-side configuration. In an alternative arrangement, the tracks may form arcs of concentric circles In other arrangements, the tracks may be in the shape of curving lines.

All of the tracks may generate a component of the same diffraction image, but it is preferred that the tracks be used to generate two or more different images. In one arrangement in which two diffraction images are generated, every second track contributes to one image and every other track contributes to the other image. It is not essential that all tracks be of the same width, but that is a preferred feature. It is not essential that the tracks for the two images be arranged alternately; they may occur in any order. There may be more than two types of tracks, associated with more than two images.

In one preferred arrangement, the diffracting surface of each track comprises a series of lines or grooves which extend across the width of the track. As an alternative to lines or grooves, it is possible to use circles, polygons and other shapes which are capable of providing the required diffraction effects. In another preferred arrangement, the diffracting surface comprises a pattern of parallelogram-shaped indentations.

In another preferred arrangement, the diffracting surface of each track comprises a series of lines or grooves which extend in a generally lengthwise direction along the track. Such lines or grooves may be straight or curved, and in one arrangement they may be undulating periodically in a sinusoidal configuration. The lines or grooves may be short and discrete, or they may be substantially continuous throughout the length of the track.

In an especially preferred arrangement, the surface relief structure may include tracks having crosswise grooves or parallelogram patterns interspersed with tracks having lengthwise grooves or parallelogram patterns, such that diffraction effects from one set of tracks are observable when the diffractive device is viewed in the direction of the tracks, and diffraction effects from another set of tracks are observable when the diffractive device is viewed perpendicular to the direction of the tracks.

As an optional refinement, one of the images generated by the diffracting tracks may be a uniform or blank image which can be encoded with image information by the physical destruction or modification of regions of diffracting surface on selected tracks to produce corresponding diffusely reflecting regions.

The invention will hereinafter be described in greater detail by reference to the attached drawings which show an example form of the invention. It is to be understood that the particularity of the drawings does not supersede the generality of the preceding description of the invention.

Figure 1:
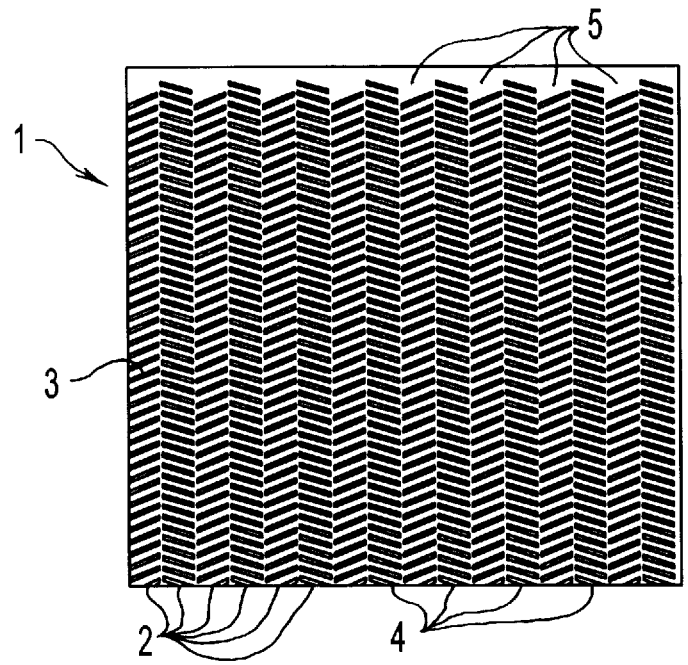
FIG. 1 is a schematic representation of a region of a surface relief structure on a diffractive device according to one embodiment of the present invention.

Referring firstly to FIG. 1, part 1 of the surface relief structure is arranged in a series of tracks 2, each track having a diffracting surface 3 which generates a component of a diffraction image. In the embodiment illustrated, two separate images are generated, one by left hand side tracks 4, and one by right hand side tracks 5. The two diffraction images are formed from image components generated by individual tracks 4 and individual tracks 5 respectively.

Each of tracks 2 may be of any suitable length. It is preferred that each track be greater than 0.5 mm in length, and for the sake of convenience, it is preferred that each track extend throughout the length of the diffractive device, although there is no requirement that this be the case. In the preferred embodiment illustrated, each of tracks 2 is straight and arranged in parallel side-by-side configuration. In alternative embodiments, the tracks may be arranged in concentric circles or sections of concentric circles, or in many other curved arrangements.

Each of tracks 2 may be of any suitable width. It is preferred that the tracks be sufficiently narrow to be not noticeable to the naked human eye. The limit of resolution of a normal human eye examining a diffractive device at close quarters is about 0.25 mm. Accordingly, tracks having a width of less than this amount are unlikely to be separately discernible to the human eye.

As stated previously, discontinuities around the borders of individual pixels in pixellated diffracting devices result in incidental diffractive effects. The extent of such incidental effects is diminished by the use of tracks according to the present invention in that discontinuities along the length of the track can be avoided, although discontinuities are still present along the sides of each track.

It is preferred although not essential that each of tracks 2 be of the same width. If each track has the same width, the encoding of diffraction image data in the diffracting surface of each track is a simpler operation. However, in situations where it is desired that the diffractive device generate multiple diffraction images, it may be desired that one such diffraction image be brighter than another, and one way of achieving such an effect is to devote wider tracks to the generation of the bright image and narrower tracks to the generation of the dull image.

In the embodiment illustrated in FIG. 1, tracks 2 are arranged substantially in side-by-side configuration. However, it is not essential that each track abut the next track, and a channel of any desired width may be left between adjacent tracks. It is sometimes advantageous to leave a small channel of about 4 micron in width between adjoining tracks to act as an air ventilation route during production of the diffractive device. Diffractive devices of the type herein described are typically manufactured by an embossing process, and it has been found that more satisfactory results are achieved if air ventilation can occur.

Figure 2:
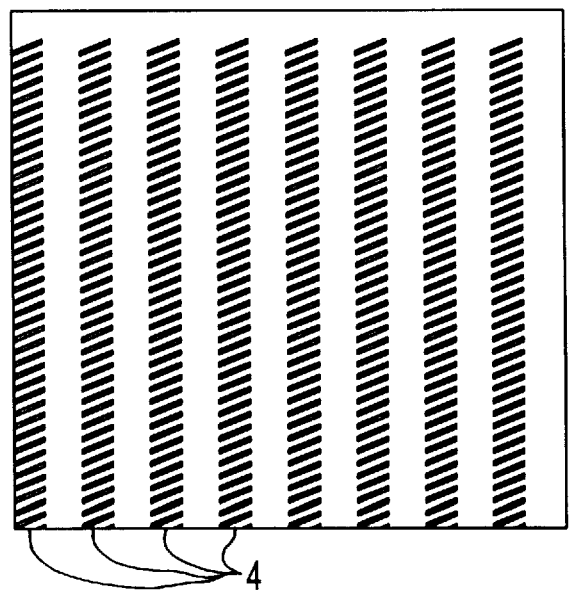
FIG. 2 is a schematic representation of parts of the surface relief structure of FIG. 1.
Figure 3:
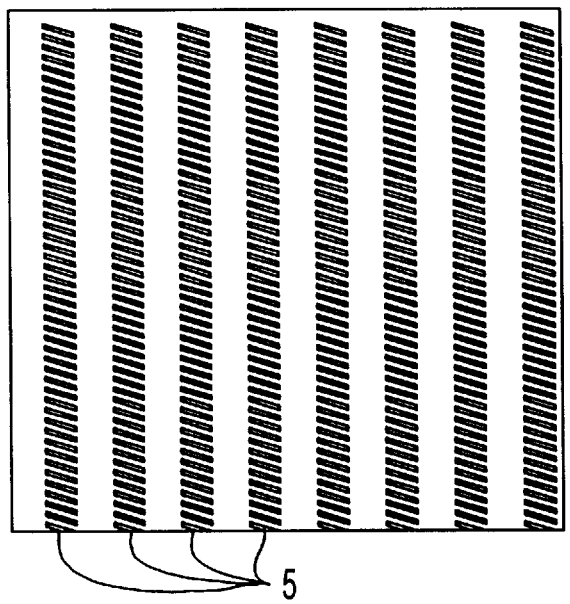
FIG. 3 is a schematic representation of other parts of the surface relief structure of FIG. 1.

The diffracting surface on each of tracks 2 may have any suitable diffractive surface relief structure. In the embodiment illustrated in FIGS. 1 to 3, the surface relief structure comprises a series of curved or straight lines or grooves which extend across the width of the track. It is not essential that lines be used, and other suitable diffractive shapes include circles and polygons. In one suitable arrangement, the surface relief structure of a track may consist of variably shaped polygon structures having dimensions less than 1 micron positioned along and across each track in such a way as to encode the diffraction image information and diffractively regenerate it. In another embodiment, the surface relief structure of a track may consist of numerous diffracting dots of sizes less than 0.25 micron, such that the diffraction image information is encoded in the spacing and distribution of the dots.

Figure 4:
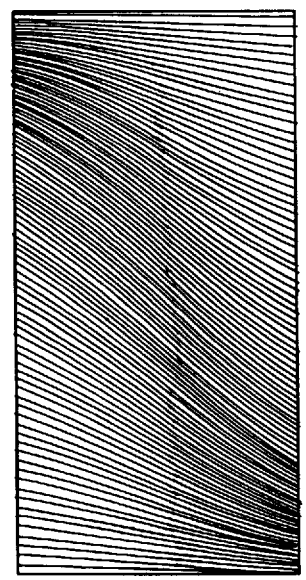
FIG. 4 is a more detailed schematic representation of two parts of tracks used in a diffractive device according to an embodiment of the present invention.
Figure 4:

FIG. 4 illustrates in more detail portions of two tracks, each consisting of a complex generalized diffraction grating structure having grooves which vary continuously in terms of spacing, orientation and curvature along the length of the track. The variations in groove spacing, curvature and orientation are the means by which the diffraction image information is encoded in the tracks. In preferred arrangements, the variations in groove spacing, angle and curvature can be described by mathematical functions of two variables whose Hessian of second derivatives with respect to the two variables is non-vanishing except along certain characteristic lines within each diffracting track.

One particular example of a suitable track grating function is given by the following expression:

$$Y = (\alpha - 2\pi(1.25\beta))Z - \tag{1}$$

$$\left( \frac{\beta}{\alpha - 2\pi(1.25\beta)} \right) \cos(2\pi X)\cos(2\pi[\alpha - 2\pi(1.25\beta)]Z)$$

where:

Z is the track groove index parameter;

α=α(Y) along the length of the track;

β=β(Y) along the length of the track;

α is a preset variable which determines the local carrier wave frequency of the track and therefore determines the local line density of the track and the colour of the image component generated by the track. Typically, 0.8<α<1.2;

β is a parameter which is set proportional to the local intensity of the colour of the track and determines the structural stability of the track. It is this parameter that is used to tune the image characteristics of the diffractive device. Typically, 0≦β≦0.056;

the number ranges of the local co-ordinates X and Y is given by 0≦X≦0.2 and 0.2≦Y≦0.6 for a left hand channel track, and 0.6≦X≦0.8 and 0.2≦Y≦0.6 for a right hand channel track; and the Hessian of the track grating is non-vanishing except along certain characteristic lines of the grating plane which, under gradient transformations, map to lines of singularity (caustics) in diffraction space. The Hessian, H(X,Y) of Z(X,Y) is a standard complex derivative given by:

$$H(X,Y) = \frac{\delta^2 Z(X,Y)}{\delta X^2} \frac{\delta^2 Z(X,Y)}{\delta X^2} - \left[ \frac{\delta^2 Z(X,Y)}{\delta X \delta Y} \right]^2 \quad (2)$$

FIG. 4 shows two track segments having track grating functions of the type described in Equation (1) above. A single track may be comprised of several such segments linked end to end, each segment being of fixed or variable length. In arrangements where each track segment is of fixed length, it is preferred that each segment form a "period" in a "carrier wave" encoded into the track, with diffraction image information being encoded into each period by means of variation in groove spacing and curvature. The track segments illustrated in FIG. 4 have a width of about 15 micron and a length of about 30 micron, although they can be scaled up or down in size as required.

Figure 8:
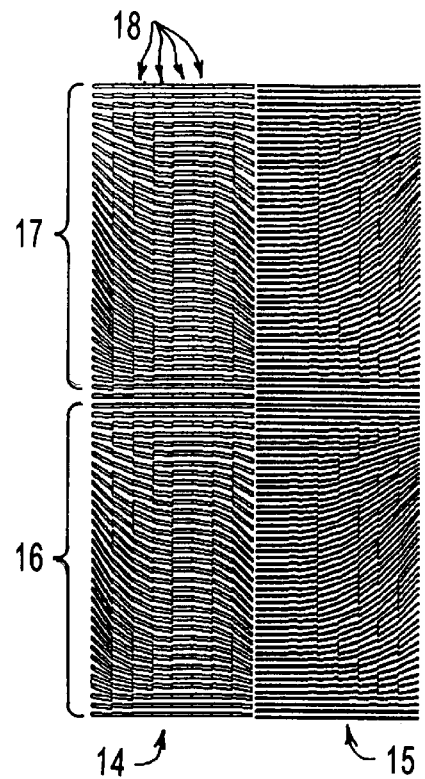
FIG. 8 shows a computer-generated detailed representation of a section of two adjacent tracks according to an embodiment of the type shown in FIG. 4.

FIG. 8 is a computer-generated representation of a section of a pair of adjacent tracks, labelled 14 (left hand track) 15 (right hand track)channel. The track sections illustrated form part of a larger structure containing several left hand tracks interspersed between several right hand tracks. The left hand tracks, when illuminated, generate one or more diffraction images observable from particular positions around the diffractive device, and the right hand tracks generate images observable from different positions. The track portions illustrated are each about 15 micron in width and 60 micron in length.

As will be seen from close examination of FIG. 8, each curved groove extending across the track is for the sake of convenience composed of eight segments 18, each of which is a parallelogram in shape. Each parallelogram indentation 18 is approximately two microns wide. Although most parallelograms 18 match up with neighbouring parallelograms to form curved grooves extending across the track, some add density to particular parts of the track surface without joining up with any neighbours.

Figure 10:
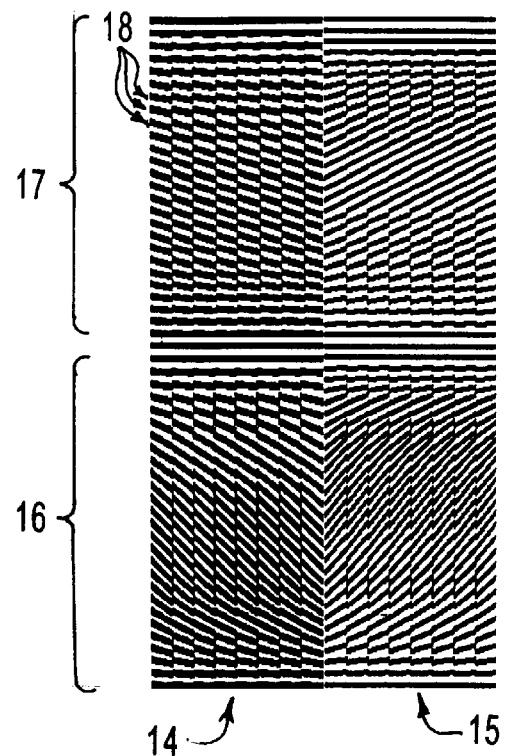
FIG. 10 is a computer-generated detailed representation of a part of two adjacent tracks according to another embodiment of the invention.

The concept of dividing each groove into eight parallelograms 18 is taken a step further in the embodiment shown in FIG. 10. In this embodiment, the track surface is comprised entirely of parallelogram-shaped indentations. The dark portions represent troughs, whereas the light portions represent crests. Some parallelograms match up with their neighbours to form grooves, but this is incidental rather than intentional as in the embodiment of FIG. 8. In any line across one of the tracks in the embodiment of FIG. 10, all parallelograms have the same angular orientation; whereas such orientation varies considerably in the embodiment of FIG. 8.

The patterns shown in both FIG. 8 and FIG. 10 are used to generate pixels in the image planes. Each of the left-hand 14 and right-hand tracks 15 in each case includes two segments (16,17), the top half 17 being one segment and the bottom half 16 being another. Each segment generates one pixel. The patterns shown are used to generate pixels having one of sixteen different greyscale values. Segments with flatter lines produce darker pixels in the image plane, and segments with steeper lines (more sharply angled parallelograms) produce lighter pixels. A large number of track segments from different tracks can thus be used to generate a complete image with sixteen greyscales.

In addition to the 16 different types of greyscale segments, the "palette" of different track segment types in a preferred arrangement includes 10 different colour effects segments. The left hand track 14 in FIG. 11 contains two colour effects segments (16,17). In the embodiment illustrated, colour effects segments are created using straight grooves which cross the track at right angles, with varying spatial frequencies. The right hand track 15 in FIG. 11 contains two more colour effects segments, but with grooves aligned with the track to create "90° effects"—that is, diffractive effects which are visible at positions 90° around from where the left hand track diffractive effects are visible.

An especially desirable type of colour effect is obtained when the colours appear to move along a path in the image plane when the diffractive device is tilted about an axis in its plane. Such effects can be obtained by sequential positioning of colour effects track segment types, with average spatial frequency increasing or decreasing along the sequence.

It is preferred that the colour effects track segments be modulated so that image components generated by those segments are observable over broader ranges of angles than they would have been if their diffracting surfaces were immodulated. A suitable general modulation function is given by:

$$y = ma + \beta F\left( Q\pi \frac{m}{n} \right)$$

where β is a modulation factor; a is the average diffraction structure spacing; Q is the number of cycles of modulation; N is the total number of grooves or equivalent diffraction structures within the track segment; m is the groove index parameter (m=1-N); and F is sin or cos or another harmonic or quadratic function.

Figure 11:
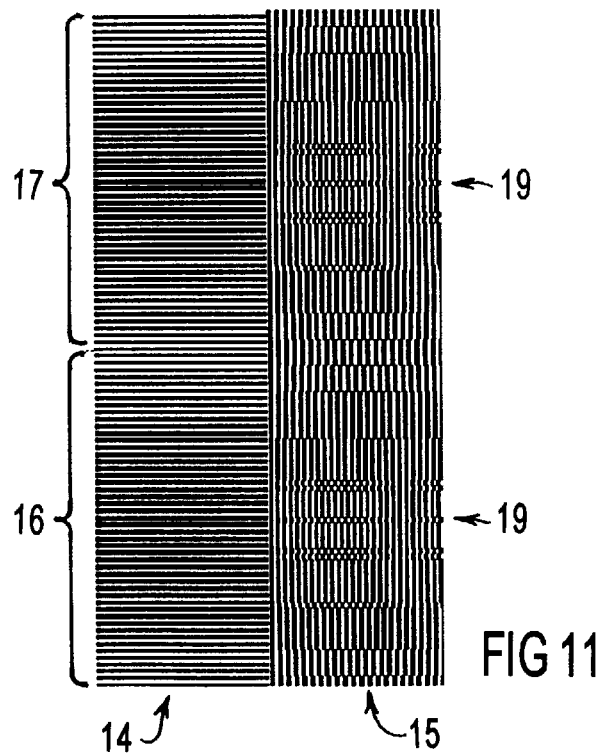
FIG. 11 is a computer-generated detailed representation of part of two adjacent tracks according to another embodiment of the invention.

The spatial frequency of the vertical grooves of the right hand track in FIG. 11 is the same at the top and bottom of each segment, and changes through several steps to a characteristic frequency in the centre 19 of each segment.

The right hand track 15 in FIG. 10 has a different average spacial frequency from the left hand track 14 in order to reduce the likelihood of interference between the two different images which are to be generated. Moreover, the parallelograms 18 in the left and right tracks have opposing angular orientations.

Track surface patterns of the types illustrated in FIGS. 8, 10 and 11 are typically created using an electron beam. A 30 micron by 30 micron surface area is typically divided into a grid of 1024 by 1024 units. This grid is then used to define the start and end points of each parallelogram. In the embodiments shown in FIGS. 8, 10 and 11, one grid area covers one track segment (30 micron long) in each of two adjacent tracks (15 micron wide each). An algorithm, written in BASIC programming language, for generating the left hand track in FIG. 10 is given by:

J1M&=JOM&+INT((45−3*(JJ-11))*ABS(SIN(1.5708*LLL/512))
*ABS(256-XINC)/1024)^1.5
J1P&=JOP&+INT((45−3*(JJ-11))*ABS(SIN(1.5708*LLL/512))
*ABS(256-XINC)/1024)^1.5 where:
  JOP is the top left corner of a parallelogram
  JOM is the bottom left corner
  J1P is the top right corner
  J1M is the bottom right corner
  JJ is the number representing the type of greyscale element (JJ is between 11 and 26, giving 16 different types)
  XINC=64 (i.e. the width of the parallelogram, in grid positions)
  LLL is a vertical index.

A similar algorithm applies for the right hand track in FIG. 10.

The diffracting tracks illustrated in FIGS. 8, 10 and 11 contain digitally encoded image information. That is, tracks are divided into segments of a predetermined size, and a portion of image information (usually corresponding with a single pixel in the image plane) is stored in each segment. It is not however necessary that tracks be divided into regular segments. Instead, the diffractive surfaces may vary continuously but irregularly in terms of diffractive structure spacing, curvature and orientation, so that image information can be stored in an analogue format rather than a digital format. In such an arrangement, the image in the image plane may be comprised of a group of lines (each line corresponding to a track) rather than a group of discrete pixels (each pixel corresponding to one or more track segments).

One or more of the diffracting tracks may contain diffusely reflecting regions (consisting of randomly spaced grooves) and/or specularly reflecting regions in between diffracting regions. Diffusely reflecting regions may be used to encode auxiliary information not found in the diffraction image. Specularly reflecting regions may be used to enhance the contrast properties of the diffracted image.

One or more diffraction images which are generated by the diffracting tracks may consist of abstract colour patterns which create variable colour effects which move along the tracks when the device is moved relative to the light source and the observer. In particular, the movement effect may be generated when the device is rotated about an axis in its own plane.

It is preferred that the diffracting tracks generate two or more diffraction images which are observable from different ranges of viewing angles around the diffractive device, with some of the diffracting tracks being devoted to producing each of the diffraction images. In the embodiment illustrated in FIGS. 1, 2 and 3, left hand tracks 4 are devoted to generating a first diffraction image which is observable from a first range of viewing angles around the diffractive device, and right hand side tracks 5 are devoted to generating a second diffraction image which is observable from a second range of viewing angles around the diffractive device. As illustrated in FIG. 1, the tracks are in an alternating right-left-right-left configuration; however, this is not necessary and the tracks may be arranged in any order, such as right-right-left-right-left-left.

Figure 5:
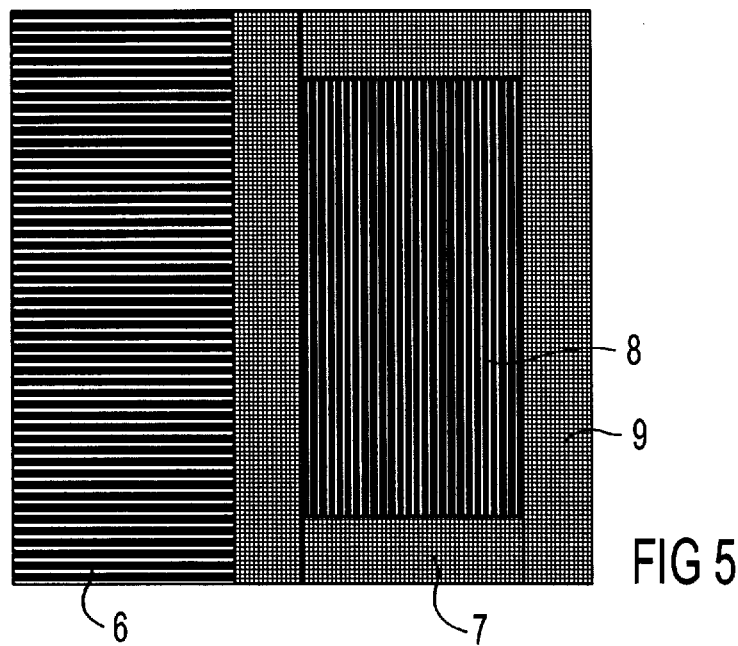
FIG. 5 is a detailed schematic representation of a part of two adjacent tracks in an alternative embodiment of the invention.

FIG. 5 shows sections of two tracks according to another embodiment of the invention. Left hand track 6 has grooves extending across the width of the track, generating diffractive images which can be observed from a direction generally along the length of the track. Right hand track 7 consists of a plurality of island regions 8 surrounded by flat regions 9. Island regions 8 have grooves extending lengthwise along the track, generating diffractive images which can be observed from a direction generally perpendicular to the length of the track. A particular advantage of the arrangement illustrated in FIG. 5 is that diffraction images are generated both in the direction of the length of the tracks and in the perpendicular direction, so that the diffractive effects of the diffractive device are more readily observable.

Figure 9:
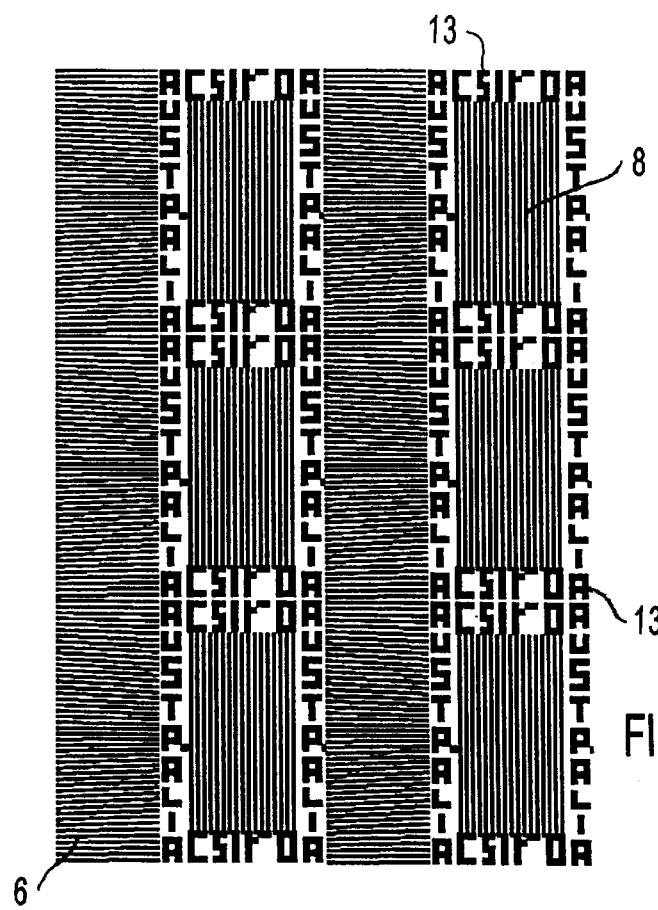
FIG. 9 shows a computer-generated detailed representation of a region of surface relief diffractive structure showing several tracks according to an embodiment of the type shown in FIG. 5.

Flat regions 9 are optional, but they provide certain advantages. As previously indicated, diffractive devices of the type described are typically created using an embossing process, and flat regions 9 act as vents for gas removal during the embossing process, resulting in a more precise finished product. Moreover, an electroplating process typically follows the embossing process, and flat regions 9 enable more accurate electroplating. Flat regions 9 may also carry printed lines which are responsive to the scan rates of particular colour photocopiers so that moire interference lines are created on a photocopies image of the diffractive device. Alternatively or additionally, flat regions 9 may be embossed or printed with micro-writing 13 having a size in the order of 2 micron as shown in FIG. 9. Such micro-writing may serve as an additional security element and may include a registration number or other identifier unique to the diffractive device on which it appears, thereby enabling verification of authenticity by means of microscopic examination.

Hand track 6, islands 8 and flat regions 9 may be of any suitable dimensions. In an especially preferred arrangement, hand track 6 and island regions 8 are each about 15 micron in width, and flat regions 9 are about 4 micron in width.

In a variation on the arrangement shown in FIG. 5, each island 8 may be connected to its neighbouring islands by means of interconnecting grooves which may be branched, so that grooves are substantially continuous throughout the length of the track.

Figure 6:
FIG. 6 shows a schematic representation of a part of a track according to another embodiment of the invention.

FIG. 6 shows a track 10 having grooves which extend substantially along the length of the track rather than substantially across the track as is the case in the track segments of FIG. 4. The diffraction effects generated by track 10 are substantially at right angles to those generated by a track comprised of track segments of the type shown in FIG. 4. Track 10 essentially comprises "carrier waves", with image information being encoded into them by means of amplitude and groove spacing variations.

In some embodiments, the variations in groove spacing, angle and curvature can be described by mathematical functions of two variables whose Hessian of second derivatives with respect to the two variables is non-vanishing except along certain characteristic lines within each diffracting track, as previously discussed. However, this is not an essential condition, and in other embodiments the Hessian of second derivatives of the grating function may be identically zero for all points within the track.

Figure 7:
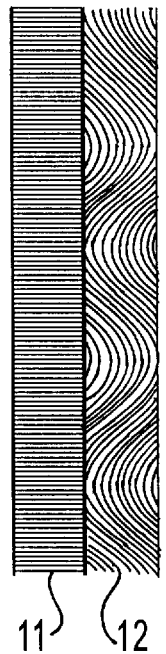
FIG. 7 shows a schematic representation of a part of two adjacent tracks according to an embodiment of the invention.

FIG. 7 illustrates schematically a combination of left and right tracks, 11 and 12 respectively. Left track 11 may be any one of the types of tracks illustrated in FIGS. 1, 2, 3, 4 and 8 and right track 12 is a track of the type shown in FIG. 6. Several such left and right tracks may combine to form a two-channel diffractive device. Tracks 11 and 12 may be of any suitable width as previously discussed, and an especially preferred width is around 15 micron. The arrangement illustrated in FIG. 7 is particularly advantageous because the image(s) produced by left tracks 11 will be observable from angles approximately 90° around from where the image(s) generated by right tracks 12 are observable.

In one embodiment of the invention, one or more of the images generated by the diffractive device may consist of a uniform or blank image plane which can be encoded with image information by the destruction or modification of diffracting elements at selected locations along selected diffraction tracks. This enables post-production modification of the diffracting device to incorporate a new diffraction image, although the resolution of the image information so incorporated is lower than the resolution normally provided by a diffracting track. A particular embodiment of this feature comprises a series of tracks. Along the length of each track, the diffracting surface alternates between surface portions which give rise to black image components in the image plane and surface portions which give rise to white image components. In order to create a dark area in the image plane, the "white" parts of the corresponding diffracting surface portions are erased; whereas the "black" surface portions are erased to create a bright area. In this way it is possible to encode a black-and-white bit image into the tracks.

As a further enhancement, the diffracting surfaces on some of the tracks may include diffusely reflecting regions. Such regions do not affect the images observed in the image phase, but they give a neutral background appearance to the diffractive device, making the images more easily observable.

As another enhancement, some of the tracks may include specularly reflecting regions. Such regions are useful in adding contrast to the images observed in the image planes.

It is to be understood that various alterations, additions and/or modifications may be incorporated into the parts previously described without departing from the ambit of the present invention.

I claim:

1. A diffractive device having a surface relief structure which, when illuminated by a light source, generates one or more diffraction images which are observable from particular ranges of viewing angles around the device, wherein at least part of the surface relief structure is arranged in a series of discrete tracks, each track having a diffracting surface which generates a component of a diffraction image, such that at least one of the diffraction images generated by the diffractive device is formed from image components generated by a plurality of the tracks, and wherein at least some tracks have diffracting grooves, or circular or polygonal, indentations or protrusions on their surfaces, varying continuously in terms of orientation, curvature and/or spacing along the track, the variations in orientation, curvature and/or spacing being a means by which image information is encoded into the tracks.

2. A diffractive device according to claim 1 wherein each track has a width of less than 0.25 mm and at least some tracks have a length greater than 0.5 mm.

3. A diffractive device according to claim 1 or claim 2 wherein the tracks are straight and parallel.

4. A diffractive device according to claim 1 or claim 2 wherein the tracks form areas of concentric circles.

5. A diffractive device according to claim 1 or claim 2 wherein the tracks are in the shape of curving lines.

6. A diffractive device according to claim 1 wherein a region of the surface relief structure generates two different diffraction images observable from different ranges of viewing angles, and a first group of tracks on the region generate one of the diffraction images, and a second group of tracks interspersed with the first group generate the other diffraction image.

7. A diffractive device according to claim 1 wherein on some tracks the diffracting surface comprises a series of grooves oriented generally across the track and on some tracks the diffracting surface comprises a series of grooves oriented generally along the track.

8. A diffractive device according to claim 1 which includes tracks which have grooves undulating periodically generally lengthwise of the tracks.

9. A diffractive device according to claim 1 which includes tracks whose diffracting surface comprises islands which have grooves extending generally lengthwise of the track, the islands being surrounded by flat regions.

10. A diffractive device according to claim 9 wherein the flat regions are embossed or printed with microwriting.

11. A diffractive device according to claim 1 wherein an image generated by the device is a uniform or blank image which can be encoded with image information by the physical destruction or modification of regions of diffracting surface on selected tracks to produce corresponding diffusely reflecting regions.

12. A diffractive device according to claim 1 wherein on some tracks the diffracting surface comprises a pattern of parallelograms of varying angular orientations, indented into the track surface.

13. A diffractive device according to claim 1 wherein parts of the diffracting surfaces on some tracks are assigned to generating greyscale image information in the image plane.

14. A diffractive device according to claim 1 wherein parts of the diffracting surfaces on some tracks are assigned to generating colour effects in the image plane.

15. A diffractive device according to claim 14 wherein the colour effects appear to move along a path in the image plane when the device is tilted about an axis in its own plane.

16. A diffractive device according to claim 1 wherein image information from an image generated by the device is encoded in an analogue manner along the length of some tracks, each track generating a line of the image, the lines generated by those tracks combining to form the image.

17. A diffractive device according to claim 1 wherein image information from an image generated by the device is encoded in a digital manner along the length of some tracks, each track generating a line of the image, the lines generated by those tracks combining to form the image.

18. A diffractive device according to claim 1 wherein some tracks include diffusely reflecting regions.

19. A diffractive device according to claim 1 wherein some of the tracks include specularly reflecting regions.

20. A diffractive device according to claim 1 wherein the variations in orientation, curvature and spacing can be described by mathematical functions of two variables in which the Hessian of second derivatives is non-vanishing except along certain characteristic lines within each track.

* * * * *